(12) United States Patent
Mullins

(10) Patent No.: US 9,495,748 B2
(45) Date of Patent: Nov. 15, 2016

(54) SEGMENTATION OF CONTENT DELIVERY

(71) Applicant: DAQRI, LLC, Los Angeles, CA (US)

(72) Inventor: Brian Mullins, Garden Grove, CA (US)

(73) Assignee: DAQRI, LLC, Los Angeles, CA (US)

( * ) Notice: Subject to any disclaimer, the term of this patent is extended or adjusted under 35 U.S.C. 154(b) by 392 days.

(21) Appl. No.: 13/840,097

(22) Filed: Mar. 15, 2013

(65) Prior Publication Data

US 2014/0267407 A1   Sep. 18, 2014

(51) Int. Cl.
*G06T 7/00* (2006.01)
*G06T 15/00* (2011.01)
*G06T 15/20* (2011.01)

(52) U.S. Cl.
CPC .............. *G06T 7/004* (2013.01); *G06T 15/20* (2013.01); *G06T 2200/16* (2013.01)

(58) Field of Classification Search
None
See application file for complete search history.

(56) References Cited

U.S. PATENT DOCUMENTS

| | | | |
|---|---|---|---|
| 6,052,125 A * | 4/2000 | Gardiner et al. | ............. 345/421 |
| 6,909,723 B1 | 6/2005 | Yonge, III et al. | |
| 7,353,451 B2 | 4/2008 | Takahashi et al. | |
| 7,783,773 B2 | 8/2010 | Wu et al. | |
| 7,933,228 B2 | 4/2011 | Coley | |
| 8,302,029 B2 * | 10/2012 | Makela | ............. G06F 17/30905 345/619 |
| 8,335,348 B2 * | 12/2012 | Srikrishnan et al. | ......... 382/103 |
| 8,370,514 B2 | 2/2013 | Hurst et al. | |
| 2004/0233171 A1 * | 11/2004 | Bell | ........................ G06T 15/40 345/168 |
| 2010/0103196 A1 * | 4/2010 | Kumar et al. | ................. 345/633 |
| 2013/0218461 A1 * | 8/2013 | Naimark | ................. G01C 21/12 701/505 |
| 2013/0335303 A1 * | 12/2013 | Maciocci et al. | .................. 345/8 |

FOREIGN PATENT DOCUMENTS

WO    WO-2014151015 A1    9/2014

OTHER PUBLICATIONS

"International Application Serial No. PCT/US2014/024765, International Search Report mailed Aug. 28, 2014", 3 pgs.
"International Application Serial No. PCT/US2014/024765, Written Opinion mailed Aug. 28, 2014", 4 pgs.
"International Application Serial No. PCT/US2014/024765, International Preliminary Report on Patentability mailed Sep. 24, 2015", 6 pgs.
European Application Serial No. 14769352.7, Extended European Search Report mailed Jul. 18, 2016, 5 pgs.

(Continued)

*Primary Examiner* — Maurice L McDowell, Jr.
*Assistant Examiner* — Donna J Ricks
(74) *Attorney, Agent, or Firm* — Schwegman Lundberg & Woessner, P.A.

(57) ABSTRACT

A system and method for segmentation of content delivery is described. A virtual object model is divided into a plurality of segments. An order of the plurality of segments is arranged in a delivery queue. Each segment of the virtual object model is delivered in the order of the delivery queue to a device that is configured to recognize a physical object that is associated with the virtual object model.

8 Claims, 10 Drawing Sheets

(56) References Cited

OTHER PUBLICATIONS

Shin, D H, et al., "Utilization of ubiquitous computiing for construction AR technology", Automation in Construction, Elsevier Science Publishers, Amsterdam, NL, vol. 18, No. 8, XP026643413, ISSN: 0926-5805, DOI: 10.1016/J.AUTCON.2009.06.001, (Dec. 2009), 1063-1069.

Winston, Yii, et al., "Distributed visual processing for augmented reality", Mixed and Augmented Reality (ISMAR), IEEE International Symposium on, IEEE, XP032309049, DOI: 10.1109/ISMAR.2012.6402536 ISBN: 978-1-4673-4660-3, (Nov. 5, 2012), 41-48.

* cited by examiner

SEGMENTATION OF CONTENT DELIVERY

TECHNICAL FIELD

The subject matter disclosed herein generally relates to the processing of data. Specifically, the present disclosure addresses systems and methods for segmentation of content delivery.

BACKGROUND

A device can be used to generate data based on an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision and object recognition) the information about the surrounding real world of the user becomes interactive. Artificial information about the environment and its objects can be overlaid on the real world. The artificial information may include large amounts of data that may cause delay for a user of a device to view the artificial information.

BRIEF DESCRIPTION OF THE DRAWINGS

Some embodiments are illustrated by way of example and not limitation in the figures of the accompanying drawings.

DETAILED DESCRIPTION

Figure 1:
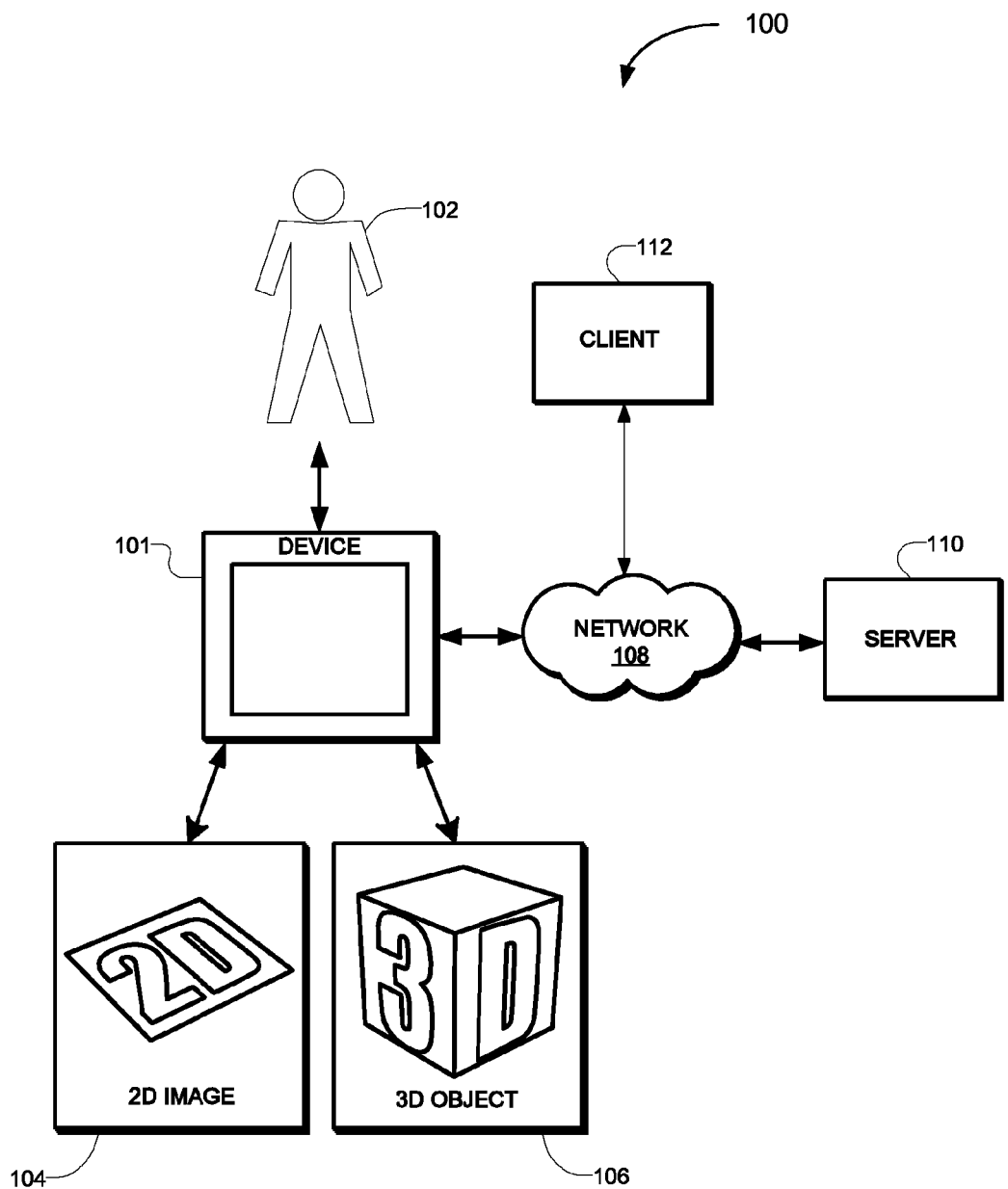
FIG. 1 is a block diagram illustrating an example of a network suitable for operating a campaign optimizer, according to some example embodiments.

Example methods and systems are directed to segmentation of content delivery. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A server for segmentation of content delivery is described. A virtual object model is divided into a plurality of segments. An order of the plurality of segments is arranged in a delivery queue. Each segment of the virtual object model is delivered in the order of the delivery queue to a device that is configured to recognize a physical object that is associated with the virtual object model.

Augmented reality applications allow a user to experience additional information, such as in the form of a virtual object overlaid on a real-time picture of a physical object captured by a camera of a device. The physical object may include a visual reference (also referred to as a content identifier) that the augmented reality application can identify and recognized. A visualization of the virtual object overlaid on the real-time picture of the physical object is generated in a display of the device. The virtual object may be based on the recognized visual reference. A rendering of the visualization of the virtual object may be based on a position and an orientation of the display relative to the visual reference and the physical object.

In one embodiment, the server includes a delivery segmentation module configured to divide a virtual object model into a plurality of segments, and to arrange an order of the plurality of segments in a delivery queue. The server may deliver each segment of the virtual object model in the order of the delivery queue to a device that is configured to recognize a physical object that is associated with the virtual object model. Each segment of the virtual object model is rendered at the device in the order the plurality of segments is sent from the server.

In one embodiment, the server generates the virtual object model to be rendered in a display of the device based on a position and an orientation of the device relative to the physical object. A presentation of the virtual object is overlaid on a real-time image of the physical object captured with the device.

In one embodiment, the delivery segmentation module arranges the order of the plurality of segments in the delivery queue based on a position and an orientation of the device in relation to the physical object.

In one embodiment, the delivery segmentation module determines the position and the orientation of the device in relation to the physical object, divides the virtual object model into the plurality of segments based on the position and the orientation of the device in relation to the physical object, and delivers the plurality of segments based on the position and the orientation of the device in relation to the physical object.

In another embodiment, the delivery segmentation module determines a first segment corresponding to an exposed portion of the virtual object model based on the position and the orientation of the device in relation to the physical object, and determines a second segment corresponding to a hidden portion of the virtual object model based on the position and the orientation of the device in relation to the physical object. The delivery segmentation module then delivers the first segment to the device prior to the second segment.

In another embodiment, the delivery segmentation module determines a first segment corresponding to a first virtual object of the virtual object model where the first virtual object is exposed based on the position and the orientation of the device in relation to the physical object. The delivery segmentation module determines a second segment corresponding to a second virtual object of the virtual object model wherein the second virtual object is hidden from view by the first virtual object based on the position and the orientation of the device in relation to the physical object. The delivery segmentation module delivers the first segment to the device prior to the second segment.

In another embodiment, the server includes an analytics computation module that generates analytics results based on analytics data received from the device and from other devices. The delivery segmentation module arranges the order of the plurality of segments in the delivery queue based on the analytics results. The delivery segmentation module accesses the analytics results, divides the virtual object model into the plurality of segments based on the analytics results, and delivers the plurality of segments based on the analytics results.

In one embodiment, the server may receive pose estimation data of the device relative to the physical object captured with the device, pose duration data of the device relative to the physical object captured with the device, pose orientation data of the device relative to the physical object captured with the device, and pose interaction data of the device relative to the physical object captured with the device. Pose estimation data may include a location on the physical or virtual object aimed by the device. Pose duration data may include a time duration within which the device is aimed at a same location on the physical or virtual object. Pose orientation data may include an orientation of the device aimed at the physical or virtual object. Pose interaction data may include interactions of the user on the device with respect the virtual object corresponding to the physical object.

In one embodiment, the content identifier may include a two-dimensional image or a three-dimensional object model. The virtual object content may include a two-dimensional or three-dimensional virtual object model. The experience generator may associate the content identifier with the virtual object content to generate the experience content dataset.

In one embodiment, the two-dimensional or three-dimensional virtual object model has at least one interactive feature that changes a state of the two-dimensional or three-dimensional virtual object model in response to an interaction from a user on the device. The server may change an interactive feature of the virtual object content from the experience content dataset based on the analytics results.

In one embodiment, the analytics data may include usage conditions of the device, the usage conditions of the device comprising social information of a user of the device, location usage information, and time information of the device using the augmented reality application.

FIG. 1 is a network diagram illustrating a network environment 100 suitable for operating an augmented reality application of a device, according to some example embodiments. The network environment 100 includes a device 101, a client 112, and a server 110, communicatively coupled to each other via a network 108. The device 101, the client 112, and the server 110 may each be implemented in a computer system, in whole or in part, as described below with respect to FIG. 12.

The server 110 may be part of a network-based system. For example, the network-based system may be or includes a cloud-based server system that provides campaign optimization for an experience content dataset. The client 112 may access the server 110 via a web-browser or a programmatic client to prepare content for delivery at the device 101.

A user 102 may use the device 101 to experience (e.g., operate, view, or play) an interactive content generated by a content dataset generated by the server 110. In one example, the user 102 may use the client 112 to use a content creation tool of the server 110 to generate the interactive content on the device 101. The user may be a human user (e.g., a human being), a machine user (e.g., a computer configured by a software program to interact with the device 101), or any suitable combination thereof (e.g., a human assisted by a machine or a machine supervised by a human). The user 102 is not part of the network environment 100, but is associated with the device 101 and may be a user of the device 101. For example, the device 101 may be a desktop computer, a vehicle computer, a tablet computer, a navigational device, a portable media device, or a smart phone belonging to the user 102.

In another example, user 102 may be a user of an application in the device 101. The application may include an augmented reality application configured to provide the user 102 with virtual information displayed on a top of image of a physical object captured in real time. The physical object may be for example, a two-dimensional physical object 104 (e.g., a picture) or a three-dimensional physical object 106 (e.g., a car or a building). For example, the user 102 may point the device 101 to capture an image of the two-dimensional physical object 104. The image is recognized locally in the device 101 using a local context recognition dataset module that contains a library of virtual object models and corresponding images. The augmented reality application then generates information (e.g., an interactive three-dimensional virtual object) in a display of the device 101 in response to identifying the recognized image. If the capture image is not recognized locally at the device 101, the device 101 may request for the three-dimensional model corresponding to the captured image, from a database of the server 110 over the network 108.

The device 101 may capture and submit analytics data to the server 110 for further analysis on usage and how the user 102 is engaged with the physical object. For example, the analytics data may include a location where the user looked at on the physical or virtual object, a length of time the user 102 has looked at each location on the physical or virtual object, how the user 102 held the device 101 when looking at the physical or virtual object, which features of the virtual object the user 102 interacted with (e.g., such as whether a user tapped on a link in the virtual object). The analytics data may be processed at the server 110 to generate another content dataset. The device 101 may receive and generate a virtual object with additional or enhanced features or a new experience based on the new content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
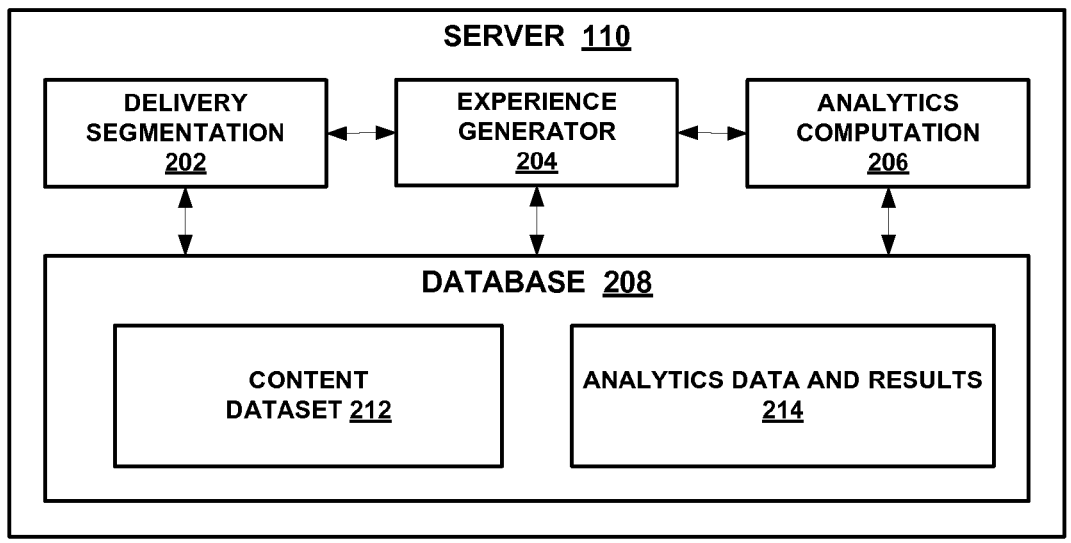
FIG. 2 is a block diagram illustrating modules (e.g., components) of a server, according to some example embodiments.

FIG. 2 is a block diagram illustrating modules (e.g., components) of the server 110, according to some example embodiments. The server 110 includes a delivery segmentation module 202, an experience generator 204, an analytics computation module 206, and a database 208.

The delivery segmentation module 202 may divide a virtual object model into several portions or segments. The segments are arranged in a delivery queue so that each segment may be asynchronously delivered the device 101. In other words, one segment of the virtual object model may be delivered before another segment of the virtual object model. The delivery segmentation module 202 is described in more details below with respect to FIG. 3.

The experience generator 204 may provide the content dataset to the device 101 that recognizes the content identifier, and generate an interactive experience with the virtual object content at the device 101. In one embodiment, the experience generator 204 generate a virtual object model using the content dataset to be rendered in a display of the device 101 based on a position of the device 101 relative to a physical object such as the two-dimensional physical object 104 (e.g., a picture) or the three-dimensional physical object 106 (e.g., a car). The device 101 recognizes the two-dimensional physical object 104 (e.g., a picture) or the three-dimensional physical object 106 (e.g., a car) as the content identifier. The visualization of the virtual object may correspond to the virtual object model overlaid on top of a real-time image of the physical object captured with the device 101. The virtual object model may be determined by an image of the physical object.

The analytics computation module 206 may operate on analytics data received from the device 101 or other devices to generate analytics results. In one embodiment, the analytics computation module 206 analyzes a pose estimation of the device 101 relative to the physical object captured with the device 101, a pose duration of the device 101 relative to the physical object captured with the device 101, a pose orientation of the device relative to the physical object captured with the device 101, and a pose interaction of the device relative to the physical object captured with the device 101. The pose estimation may include a location on the physical or virtual object aimed by the device 101. The pose duration may include a time duration within which the device 101 is aimed at a same location on the physical or virtual object. The pose orientation may include an orientation and a position of the device 101 aimed at the physical or virtual object. The pose interaction may include interactions of the user on the device 101 with respect the virtual object corresponding to the physical object.

The database 208 may include content dataset 212, and analytics and results data 214. The content dataset 212 may include datasets generated based on content creation template data using a content creation tool. For example, the datasets may include a library or a table of interactive virtual contents (e.g., virtual object models) and corresponding images of physical contents.

The analytics and results data 214 may include analytics data received from devices. For example, the analytics data may include pose estimation data, pose duration data, pose orientation data, pose interaction data, sentiment data, among others. The analytics and results data 214 may include results data from an analysis of the analytics data generated by the analytics computation module 206. Results data may include, for example, most often used features, most often looked at location of a virtual content from the content dataset 212.

Figure 3:
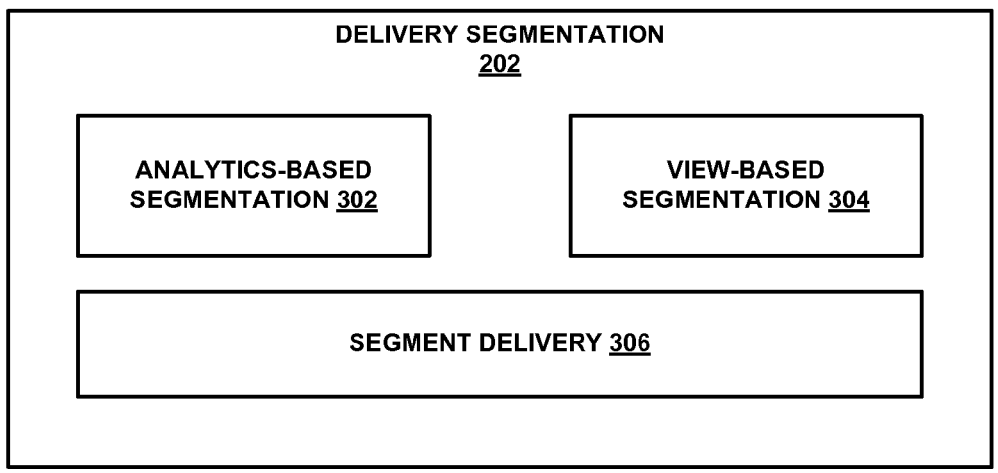
FIG. 3 is a block diagram illustrating modules (e.g., components) of a delivery segmentation module, according to some example embodiments.

FIG. 3 is a block diagram illustrating modules (e.g., components) of the delivery segmentation module 202, according to some example embodiments. The delivery segmentation module 202 includes an analytics-based segmentation module 302, a view-based segmentation module 304, and a segment delivery module 306.

In one embodiment, the analytics-based segmentation module 302 may access the analytics results, and may divide the virtual object model into segments based on the analytics results. The segment delivery module 306 may deliver the segments in an order based on the analytics results.

In one embodiment, the view-based segmentation module 304 determines the position and the orientation of the device 101 in relation to the physical object 104 or 106. The view-based segmentation module 304 divides the virtual object model into segments based on the position and the orientation of the device 101 in relation to the physical object 104 or 106. The segment delivery module 306 may deliver the segments in an order based on the position and the orientation of the device 101 in relation to the physical object 104 or 106.

In another embodiment, the view-based segmentation module 304 may determine that a first segment corresponds to a first virtual object of the virtual object model. The first virtual object may be exposed in a view based on the position and the orientation of the device 101 in relation to the physical object 104 or 106. The view-based segmentation module 304 may determine that a second segment correspond to a second virtual object of the virtual object model. The second virtual object may be hidden from view by the first virtual object based on the position and the orientation of the device in relation to the physical object. The segment delivery module 306 may deliver the first segment before the second segment to the device 101.

Figure 4:
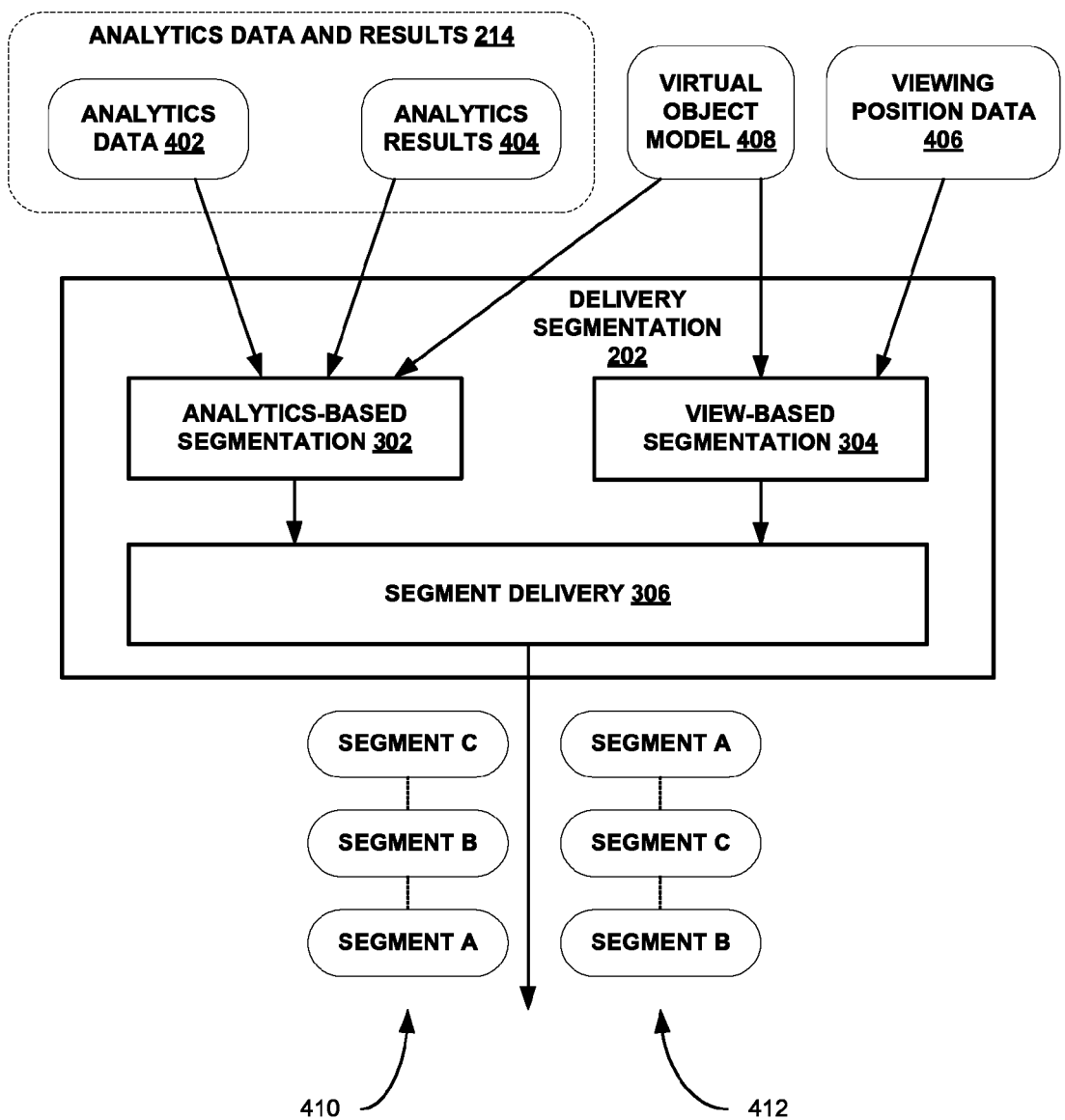
FIG. 4 is a block diagram illustrating an example of an operation of the delivery segmentation module, according to some example embodiments.

FIG. 4 is a block diagram illustrating an example of an operation of the delivery segmentation module 202, according to some example embodiments. The analytics-based segmentation module 302 of the delivery segmentation module 202 receives analytics data 402, analytics results 404, and a virtual object model 408 that correspond to an image of the physical object being recognized by the server 110 or the device 101. The image of the physical object may be recognized by the server 110 if a hash of the image of the physical object matches a hash of an image in the content dataset 212 of the server 110. The image of the physical object may be recognized by the device 101 if a hash of the image of the physical object matches a hash of an image in a content dataset of the server device 101.

The view-based segmentation module 304 of the delivery segmentation module 202 receives viewing position data 406 comprising the position and the orientation of the device 101 in relation to the physical object, and a virtual object model 408 that correspond to an image of the physical object being recognized by the server 110 or the device 101.

The segment delivery module 306 may deliver the segments in an order based on either the analytics-based segmentation module 302 or the view-based segmentation module 304. As such, in one embodiment, the order in which the segments are delivered or sent from the server 110 may be based on analytics data and results 214. For example, the segment delivery module 306 may first deliver or generate segment A, then segment B, then segment C using analytics-based segmentation module 302. In another embodiment, the order in which the segments are delivered or sent from the server 110 may be based on an orientation or position of the device 101 viewing the physical object. For example, the segment delivery module 306 may first deliver or generate segment B, then segment C, then segment A using view-based segmentation module 304.

Figure 5:
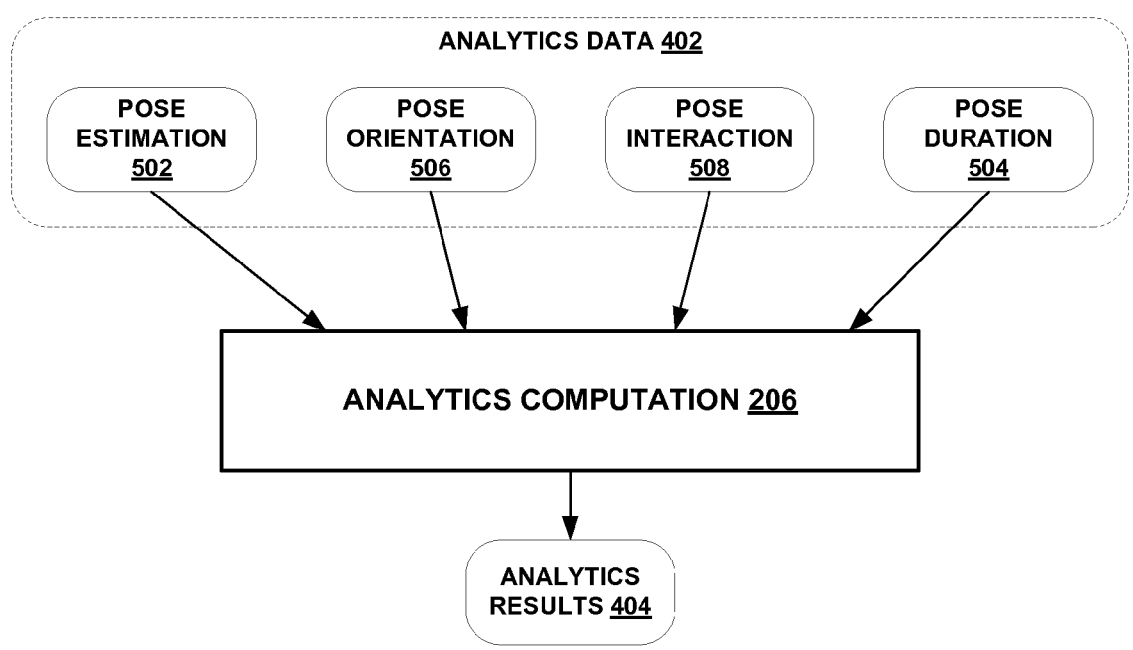
FIG. 5 is a block diagram illustrating an example of an operation of the analytics computation, according to some example embodiments.

FIG. 5 is a block diagram illustrating an example of an operation of the analytics computation module 206, according to some example embodiments. The analytics computation module 206 operates on analytics data 402. In one embodiment, analytics data 402 include pose estimation data 502, pose duration data 508, pose orientation data 506, and pose interaction data 508.

Pose estimation data 502 may include the location on a virtual object or physical object the device 101 is aiming at. For example, the device 101 may aim at the top of a virtual statue generated by aiming the device 101 at the physical object 104. In another example, the device 101 may aim at the shoes of a person in a picture of a magazine.

Pose duration data 504 may include a time duration within which the device 101 is aimed at a same location on the physical or virtual object. For example, pose duration data 504 may include the length of the time the user 102 has aimed and maintained the device at the shoes of a person in the magazine. User sentiment and interest of the shoes may be inferred based on the length of the time the user 102 has held the device 101 aimed at the shoes.

Pose orientation data 506 may be configured to determine an orientation of the device aimed at the physical or virtual object. For example, the pose orientation module 506 may determine that the user 102 is holding the device 101 in a landscape mode and thus may infer a sentiment or interest based on the orientation of the device 101.

Pose interaction data 508 may include data on interactions of the user 102 on the device 101 with respect the virtual object corresponding to the physical object. For example, the virtual object may include features such as virtual menus or button. When the user 102 taps on the virtual button, a browser application in the device 101 is launched to a preselected website associated with the tapped virtual dialog box. Pose interaction data 508 may include data measuring and determining which button the user 102 has tapped on, how often the user 102 has tapped on which button, the click through rate for each virtual buttons, websites visited by the user 102 from an augmented application, and so forth.

The analytics computation module 206 analyzes the data submitted to determine patterns, trends using statistical algorithms. For example, the analytics computation module 206 may determine features most used or clicked on, colors of virtual object clicked on the most or least, areas of the virtual object viewed the most, and so forth. The resulting computation of the analytics computation module 206 may be referred to as analytics results 404.

Figure 6:
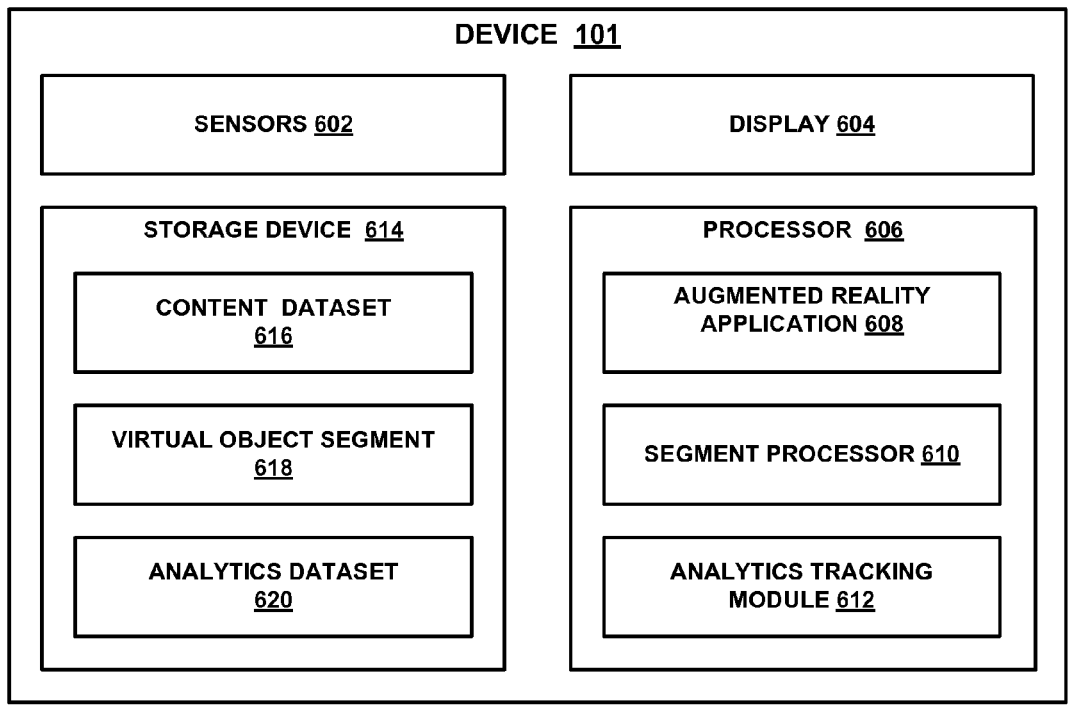
FIG. 6 is a block diagram illustrating modules (e.g., components) of a device, according to some example embodiments.

FIG. 6 is a block diagram illustrating modules (e.g., components) of the device 101, according to some example embodiments. The device 101 may include sensors 602, a display 604, a processor 606, and a storage device 616. For example, the device 101 may be a desktop computer, a vehicle computer, a tablet computer, a navigational device, a portable media device, or a smart phone of a user. The user may be a human user (e.g., a human being), a machine user (e.g., a computer configured by a software program to interact with the device 101), or any suitable combination thereof (e.g., a human assisted by a machine or a machine supervised by a human).

The sensors 602 may include, for example, a proximity sensor, an optical sensor (e.g., charged-coupled device (CCD)), an orientation sensor (e.g., gyroscope), an audio sensor (e.g., a microphone). For example, the sensors 602 may include a rear facing camera and a front facing camera in the device 101. It is noted that the sensors described herein are for illustration purposes and the sensors 602 are thus not limited to the ones described.

The display 604 may include, for example, a touchscreen display configured to receive a user input via a contact on the touchscreen display. In another example, the display 604 may include a screen or monitor configured to display images generated by the processor 606.

The processor 606 may include an augmented reality application 608, a segment processor 610, and an analytics tracking module 612.

The augmented reality application 608 may generate a visualization of a three-dimensional virtual object overlaid on top an image of a physical object captured by the device 101 in the display 604 of the device 101. A visualization of the three-dimensional virtual object may be manipulated by adjusting a position of the physical object relative to the camera of the device 101. Similarly, the visualization of the three-dimensional virtual object may be manipulated by adjusting a position of the device 101 relative to the physical object.

In one embodiment, the augmented reality application 608 communicates with the content dataset 616 in the device storage device 614 to retrieve three-dimensional models of virtual objects associated with a captured image. For example, the captured image may include a visual reference (also referred to as a marker) that consists of an identifiable image, symbol, letter, number, machine-readable code. For example, the visual reference may include a bar code, a QR code, or an image that has been previously associated with a three-dimensional virtual object.

In one embodiment, the segment processor 610 receives segments from the server 110 and renders a portion of a virtual object with each segment as they are received at the device. The segments receives from the server 110 may be stored locally in virtual object segment 618 of the storage device 614. Once all segments of a virtual object are received, the virtual object model is transferred and stored in the content dataset 616.

The analytics tracking module 612 may track analytics data related to how the user 102 is engaged with the physical object. For example, the analytics tracking module 612 may track where on the physical or virtual object the user 102 has looked at, how long the user 102 has looked at each location on the physical or virtual object, how the user 102 held the device 101 when looking at the physical or virtual object, which features of the virtual object the user 102 interacted with (e.g., such as whether a user tapped on a link in the virtual object).

The storage device 614 may be configured to store a database of visual references (e.g., images) and corresponding virtual object model (e.g., three-dimensional virtual objects, interactive features of the three-dimensional virtual objects) in a content dataset 616. For example, the visual reference may include a machine-readable code or a previously identified image (e.g., a picture of shoe). The previously identified image of the shoe may correspond to a three-dimensional virtual model of the shoe that can be viewed from different angles by manipulating the position of the device 101 relative to the picture of the shoe. Features of the three-dimensional virtual shoe may include selectable icons on the three-dimensional virtual model of the shoe. An icon may be selected or activated by tapping or moving on the device 101.

In one embodiment, the storage device 614 includes the content dataset 616, the virtual object segment 618, and analytics data 620.

The content dataset 610 includes, for example, a set of images and corresponding content experiences (e.g., interactive three-dimensional virtual object models). The content dataset 610 may include a core set of images or the most popular images determined by the server 110. The core set of images may include a limited number of images identified by the server 110. For example, the core set of images may include the cover image of the ten most popular magazines and the corresponding experiences (e.g., virtual objects). In another example, the server 110 may generate the first set of images based on the most popular or often scanned images received at the server 110.

The content dataset 616 may also include, for example, a second set of images and corresponding experiences (e.g., three-dimensional virtual object models) retrieved from the server 110. For example, images captured with the device 101 that are not recognized in the core set of images are submitted to the server 110 for recognition. If the captured image is recognized by the server, a corresponding experience may be downloaded at the device 101 and stored in the content dataset 616.

The analytics data 620 corresponds to analytics data collected by the analytics tracking module 612.

In one embodiment, the device 101 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the device 101). Accordingly, the network 108 may be a wired network, a wireless network (e.g., a mobile or cellular network), or any suitable combination thereof. The network may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
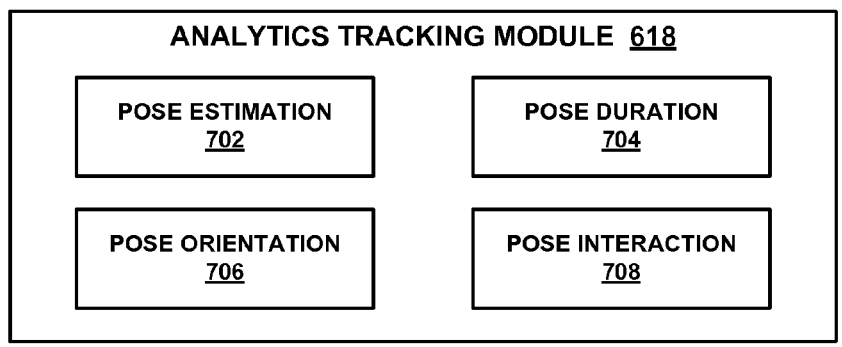
FIG. 7 is a block diagram illustrating modules (e.g., components) of the analytics tracking module, according to some example embodiments.

FIG. 7 is a block diagram illustrating modules (e.g., components) of the analytics tracking module 718, according to some example embodiments. The analytics tracking module 718 includes a pose estimation module 702, a pose duration module 704, a pose orientation module 706, and a pose interaction module 708.

The pose estimation module 702 may be configured to detect the location on a virtual object or physical object the device 101 is aiming at. For example, the device 101 may aim at the top of a virtual statue generated by aiming the device 101 at the physical object 104. In another example, the device 101 may aim at the shoes of a person in a picture of a magazine.

The pose duration module 704 may be configured to determine a time duration within which the device 101 is aimed at a same location on the physical or virtual object. For example, the pose duration module 704 may measure the length of the time the user 102 has aimed and maintained the device at the shoes of a person in the magazine. Sentiment and interest of the shoes may be inferred based on the length of the time the user 102 has held the device 101 aimed at the shoes.

The pose orientation module 706 may be configured to determine an orientation of the device aimed at the physical or virtual object. For example, the pose orientation module 706 may determine that the user 102 is holding the device 101 in a landscape mode and thus may infer a sentiment or interest based on the orientation of the device 101.

The pose interaction module 708 may be configured to determine interactions of the user 102 on the device 101 with respect the virtual object corresponding to the physical object. For example, the virtual object may include features such as virtual menus or button. When the user 102 taps on the virtual button, a browser application in the device 101 is launched to a preselected website associated with the tapped virtual dialog box. The pose interaction module 708 may measure and determine which buttons the user 102 has tapped on, the click through rate for each virtual buttons, websites visited by the user 102 from the augmented reality application 608, and so forth.

Figure 8A:
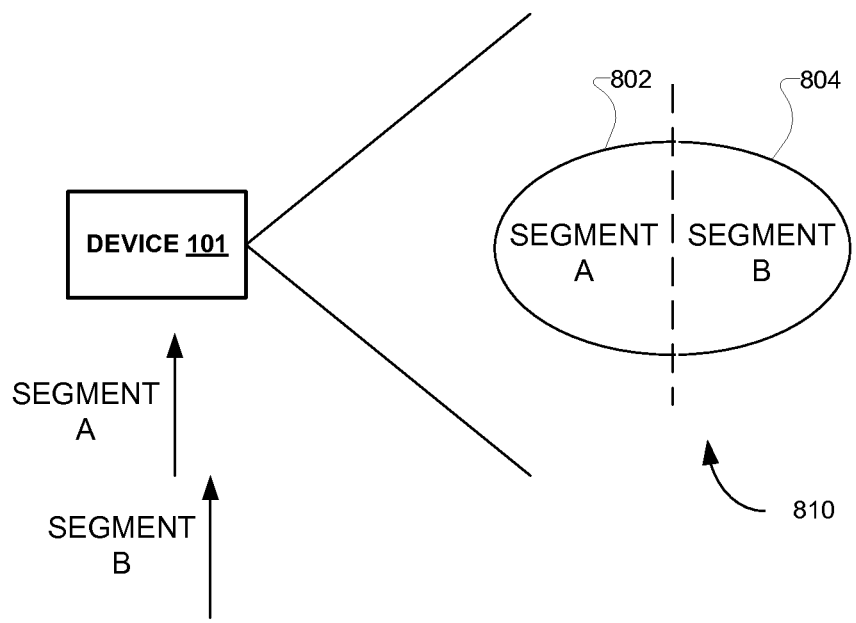
FIG. 8A is a block diagram illustrating an example of an operation of the delivery segmentation module of a virtual object, according to some example embodiments.

FIG. 8A is a block diagram illustrating an example of an operation of the delivery segmentation module of a virtual object 810, according to some example embodiments. The device 101 receives segment A prior to segment B. In this example, segment A corresponds to an exposed portion 802 of the virtual object 810 based on the location of device 101. Segment B corresponds to a hidden (non-exposed) portion 804 based on the location of device 101. As such, device 101 first renders the exposed portion 802 of the virtual object 810 by processing segment A prior to segment B.

Figure 8B:
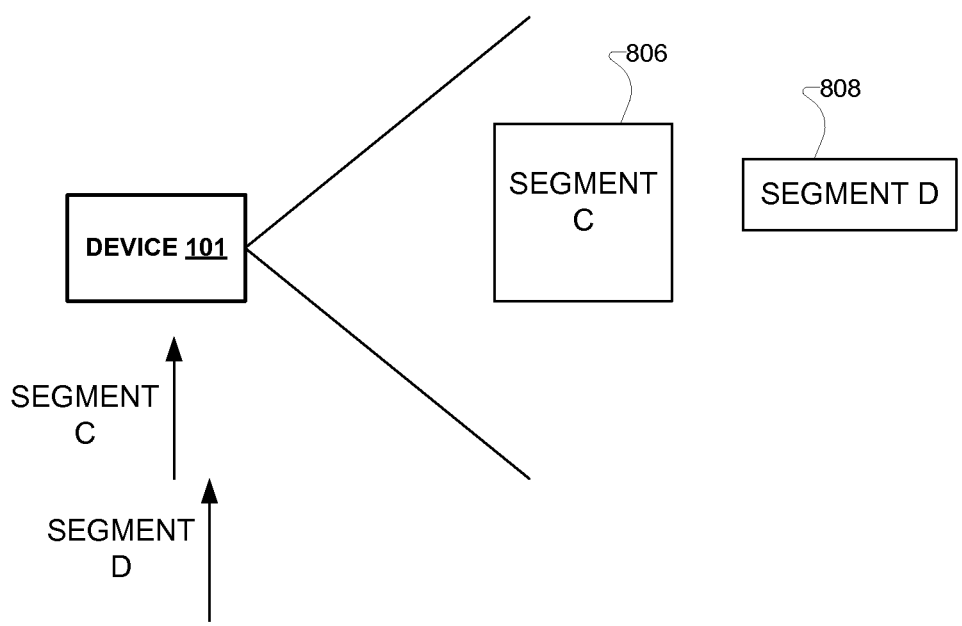
FIG. 8B is a block diagram illustrating an example of an operation of the delivery segmentation module of several virtual objects, according to some example embodiments.

FIG. 8B is a block diagram illustrating an example of an operation of the delivery segmentation module of several virtual objects, according to some example embodiments. Virtual object 806 blocks a view of virtual object 808. As such, the device 101 first receives and processes segment C to render virtual object 806 before processing segment D to render virtual object 808.

Figure 9:
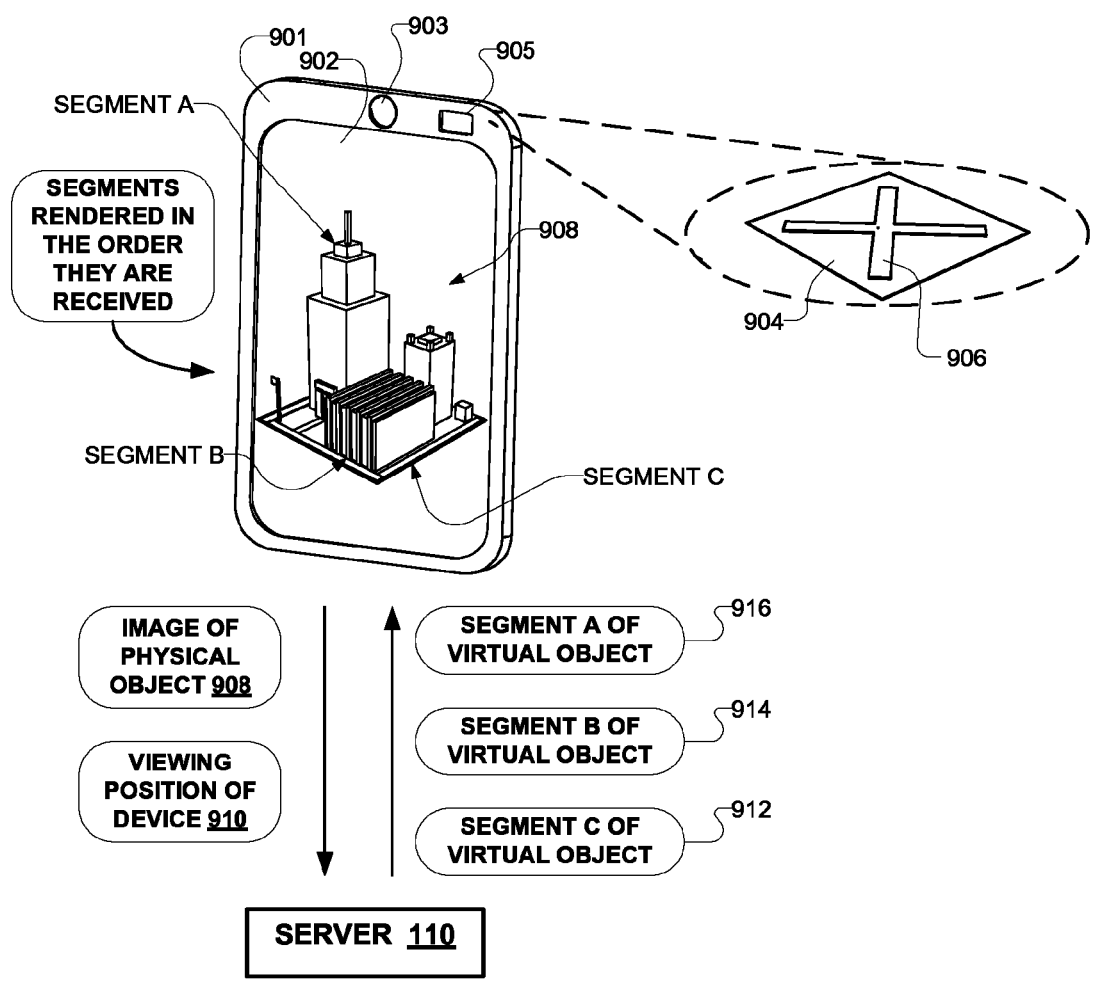
FIG. 9 is a schematic diagram illustrating an example of a flow process for segmentation of content delivery, according to some example embodiments.

FIG. 9 is a schematic diagram illustrating an example of consuming an experience, according to some example embodiments. The device 901 may be pointed at a physical object 904 having a picture 906 that is recognized by the device 901. The device 901 submits a hash of the image 908 along with viewing position and orientation data of the device 910 to the server 110. The viewing position and orientation relative to the physical object 904 may be determined based on the position and orientation of the picture 906.

The delivery segmentation 202 of the server 110 divides a virtual object model 908 associated with the picture 906 into several segments: segment A, B, and C. The delivery segmentation 202 then prioritizes delivery of each segment based on the relative position and orientation of the device 901 to the physical object 904. For example, segment A of the virtual object is first delivered at 916 so that the device 101 may start rendering the portion corresponding to segment A. In another example, analytics data may indicate that most user first examine the top of the building which corresponds to segment A. Segment B is then delivered and rendered on the device. Segment C is last because it corresponds to the bottom and opposite side of the building. Because the user is viewing the building at an angle from the top, segment c can be rendered last because it is hidden from the user viewing the building at an angle from the top. As such, segments are rendered on the device in the order they are received.

Figure 10:
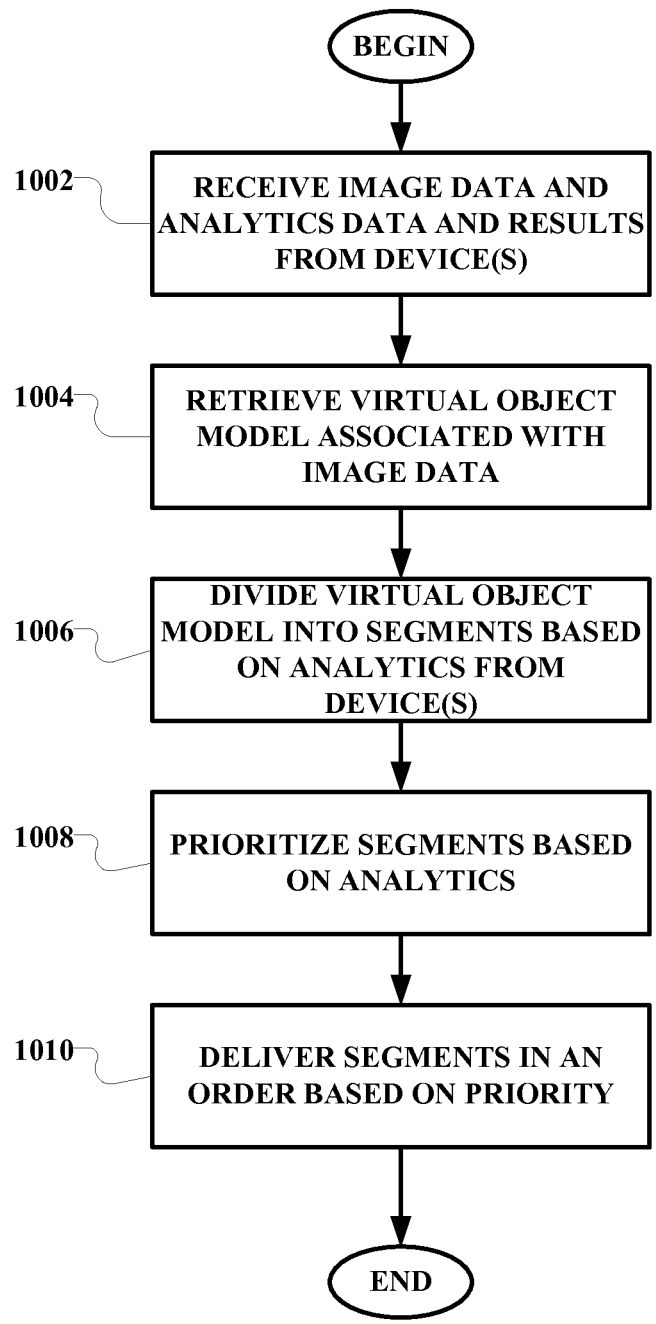
FIG. 10 is a flowchart illustrating an example method for segmentation of content delivery, according to some example embodiments.

FIG. 10 is a flowchart illustrating an example method for segmentation of content delivery, according to some example embodiments. At operation 1002, a delivery segmentation module 202 of the server 110 may receive image data and analytics data and results from one or more devices.

At operation 1004, the delivery segmentation module 202 retrieves a virtual object model associated with the image data.

At operation 1006, the delivery segmentation module 202 divides the virtual object model into segments based on analytics from the device.

At operation 1008, the delivery segmentation module 202 prioritizes segments based on analytics.

At operation 1010, the delivery segmentation module 202 delivers segments in an order based on the priority.

Figure 11:
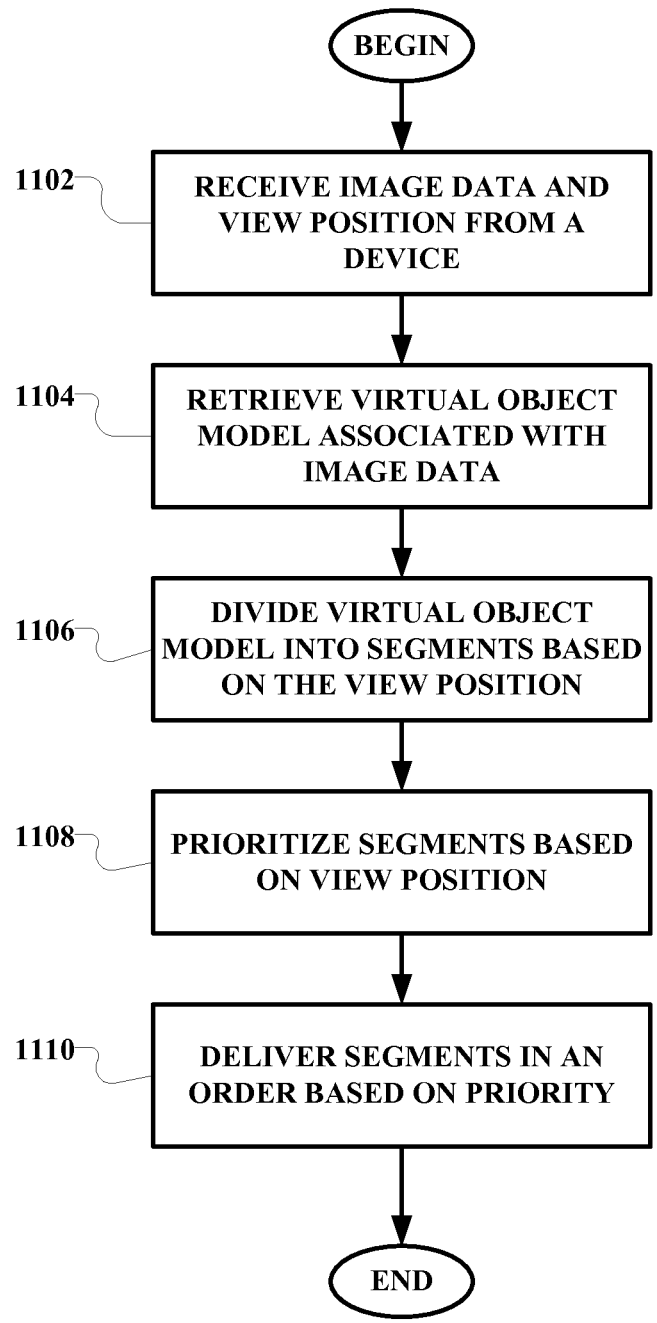
FIG. 11 is a flowchart illustrating another example method for segmentation of content delivery, according to some example embodiments.

FIG. 11 is a flowchart illustrating another example method for segmentation of content delivery, according to some example embodiments.

At 1102, the delivery segmentation module 202 receives image data and view position from a device.

At 1104, the delivery segmentation module 202 retrieves virtual object model associated with image data.

At 1106, the delivery segmentation module 202 divides virtual object model into segments based on the view position.

At 1108, the delivery segmentation module 202 prioritizes segments based on view position.

At 1110, the delivery segmentation module 202 delivers segments in an order based on priority.

Figure 12:
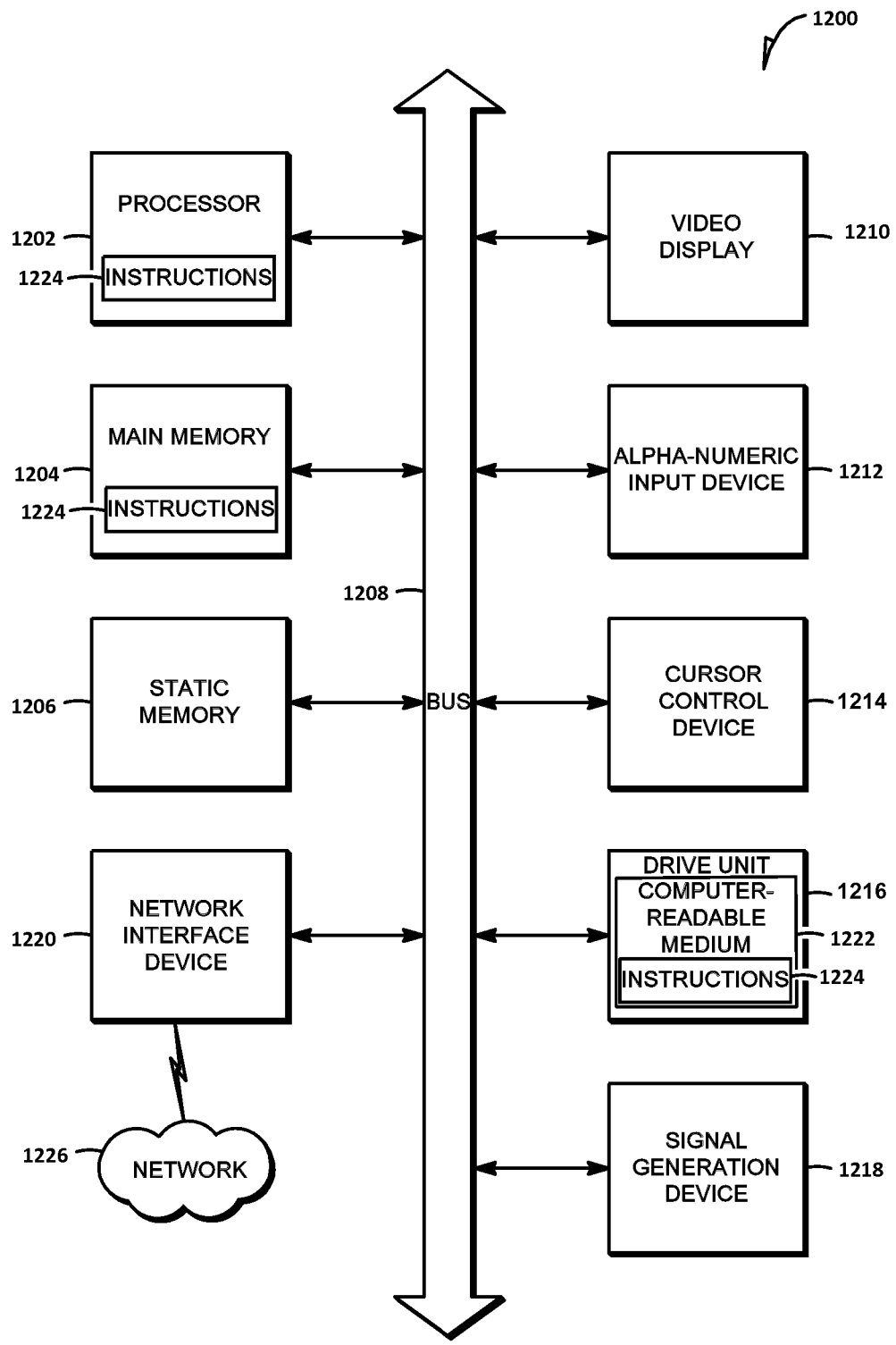
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 12 shows a diagrammatic representation of the machine 1200 in the example form of a computer system and within which instructions 1224 (e.g., software, a program, an application, an applet, an app, or other executable code) for causing the machine 1200 to perform any one or more of the methodologies discussed herein may be executed, in whole or in part. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 108) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A server comprising:
   a memory configured to store a three-dimensional model of a virtual object; and
   a hardware processor implemented by a delivery segmentation module configured to:
   divide the three-dimensional model into a plurality of segments, each segment of the three-dimensional model corresponding to a part of the virtual object;
   determine a position and an orientation of a device in relation to a physical object;
   divide the three-dimensional model into a first and a second segment of the plurality of segments based on the position and the orientation of the device in relation to the physical object, the first segment including parts of the virtual object visible from the device, the second segment including parts of the virtual object not visible from the device;
   generate analytics results based on analytics data received from a plurality of devices, the analytics results identifying a rate at which each feature of the three-dimensional model is interacted with and a rate at which each location on the three-dimensional model is viewed by the plurality of devices;
   divide the three-dimensional model into a third and a fourth segment of the plurality of segments based on the analytics results, a feature included in the third segment being interacted with more often than a feature included in the fourth segment, a location corresponding to the third segment being viewed more often than a location corresponding to the fourth segment;
   arrange an order of the plurality of segments in a delivery queue based on the analytics results or based on the position and the orientation of the device in relation to the physical object, the first segment being queued before the second segment in the delivery queue, the third segment being queued before the fourth segment in the delivery queue; and
   deliver each segment in accordance with the order of the delivery queue to the device that is configured to recognize the physical object that is associated with the three-dimensional model of the virtual object.

2. The server of claim 1, wherein the delivery segmentation module is configured to:
   determine a fifth segment corresponding to a first externally visible surface part of the virtual object,
   determine a sixth segment corresponding to a second externally visible surface part of the virtual object,
   determine that the fifth segment is in a line of sight between the device and the fifth segment, and
   deliver the fifth segment to the device prior to the sixth segment, the sixth segment rendered at the device after the fifth segment is rendered at the device.

3. The server of claim 1, wherein the delivery segmentation module is configured to:
   determine a fifth segment corresponding to a part of a first virtual object, and
   determine a sixth segment corresponding to a part of a second virtual object,
   determine that the fifth segment is in a line of sight between the device and the sixth segment, and
   deliver the fifth segment to the device prior to the sixth segment, the sixth segment rendered at the device after the segment is rendered at the device.

4. The server of claim 1, wherein the delivery segmentation module is configured to:
   receive pose estimation data of the device relative to the physical object captured with the device, pose duration data of the device relative to the physical object captured with the device, pose orientation data of the device relative to the physical object captured with the device, and pose interaction data of the device relative to the physical object captured with the device.

5. A computer-implemented method comprising:
   dividing a three-dimensional model of a virtual object into a plurality of segments, each segment of the three-dimensional model corresponding to a part of the virtual object;
   determining a position and an orientation of a device in relation to a physical object;
   dividing the three-dimensional model into a first and a second segment of the plurality of segments based on the position and the orientation of the device in relation to the physical object, the first segment including parts of the virtual object visible from the device, the second segment including parts of the virtual object not visible from the device;
   generating analytics results based on analytics data received from a plurality of devices, the analytics results identifying a rate at which each feature of the three-dimensional model is interacted with and a rate at which each location on the three-dimensional model is viewed by the plurality of devices;
   dividing the three-dimensional model into a third and a fourth segment of the plurality of segments based on the analytics results, a feature corresponding to the third segment being operated on more often than a feature corresponding to the fourth segment, a location corresponding to the third segment being viewed more often than a location corresponding to the fourth segment;
   arranging an order of the plurality of segments in a delivery queue based on the analytics results or based on the position and the orientation of the device in relation to the physical object, the first segment being queued before the second segment in the delivery queue, the third segment queued before the fourth segment in the delivery queue; and
   delivering each segment in accordance with the order of the delivery queue to the device that is configured to recognize the physical object that is associated with the three-dimensional model of the virtual object.

6. The computer-implemented method of claim 5, further comprising:
   determining a fifth segment corresponding to a first externally visible surface part of the virtual object;
   determining a sixth segment corresponding to a second externally visible surface part of the virtual object;
   determining that the fifth segment is in a line of sight between the device and the second segment; and
   delivering the fifth segment to the device prior to the sixth segment, the sixth segment rendered at the device after the fifth segment is rendered at the device.

7. The computer-implemented method of claim 5, further comprising:
   determining a fifth segment corresponding to a part of a first virtual object;
   determining a sixth segment corresponding to a part of a second virtual object;
   determining that the fifth segment is in a line of sight between the device and the sixth segment; and
   delivering the fifth segment to the device prior to the sixth segment, the sixth segment rendered at the device after the fifth segment is rendered at the device.

8. A non-transitory machine-readable storage medium comprising instructions that, when executed by one or more processors of a machine, cause the machine to perform operations comprising:
   dividing a three-dimensional model of a virtual object into a plurality of segments, each segment of the three-dimensional model corresponding to a part of the virtual object;
   determining a position and an orientation of a device in relation to a physical object;
   dividing the three-dimensional model into a first and a second segment of the plurality of segments based on the position and the orientation of the device in relation to the physical object, the first segment including parts of the virtual object visible from the device, the second segment including parts of the virtual object not visible from the device;
   generating analytics results based on analytics data received from a plurality of devices, the analytics results identifying a rate at which each feature of the three-dimensional model is interacted with and a rate at which each location on the three-dimensional model is viewed by the plurality of devices;
   dividing the three-dimensional model into a third and a fourth segment of the plurality of segments based on the analytics results, a feature corresponding to the third segment being operated on more often than a feature corresponding to the fourth segment, a location corresponding to the third segment being viewed more often than a location corresponding to the fourth segment;
   arranging an order of the plurality of segments in a delivery queue based on the analytics results or based on the position and the orientation of the device in relation to the physical object, the first segment being queued before the second segment in the delivery queue, the third segment queued before the fourth segment in the delivery queue; and
   delivering each segment in accordance with the order of the delivery queue to the device that is configured to recognize the physical object that is associated with the three-dimensional model of the virtual object.

* * * * *

UNITED STATES PATENT AND TRADEMARK OFFICE
CERTIFICATE OF CORRECTION

PATENT NO. : 9,495,748 B2  
APPLICATION NO. : 13/840097  
DATED : November 15, 2016  
INVENTOR(S) : Brian Mullins Page 1 of 1

It is certified that error appears in the above-identified patent and that said Letters Patent is hereby corrected as shown below:

On the Title Page

On page 2, in Column 1, item (56) References Cited, under "Other Publications", Line 1, delete "computiing" and insert --computing--, therefor In the Claims In Column 16, Line 20, in Claim 3, before "segment", insert --fifth--, therefor Signed and Sealed this  
Thirteenth Day of February, 2018

Andrei Iancu  
*Director of the United States Patent and Trademark Office*